US011041419B2

(12) United States Patent
Wang

(10) Patent No.: US 11,041,419 B2
(45) Date of Patent: Jun. 22, 2021

(54) EXHAUST GAS POST-PROCESSING SYSTEM

(71) Applicant: Doosan Infracore Co., Ltd., Incheon (KR)

(72) Inventor: Tae Joong Wang, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 16/345,295

(22) PCT Filed: Oct. 26, 2017

(86) PCT No.: PCT/KR2017/011878
§ 371 (c)(1),
(2) Date: Apr. 26, 2019

(87) PCT Pub. No.: WO2018/080179
PCT Pub. Date: May 3, 2018

(65) Prior Publication Data
US 2019/0301324 A1    Oct. 3, 2019

(30) Foreign Application Priority Data
Oct. 26, 2016  (KR) .......................... 10-2016-0139840

(51) Int. Cl.
*F01N 3/20* (2006.01)
*F01N 3/025* (2006.01)
(Continued)

(52) U.S. Cl.
CPC ............. *F01N 3/025* (2013.01); *F01N 3/023* (2013.01); *F01N 3/035* (2013.01); *F01N 3/20* (2013.01);
(Continued)

(58) Field of Classification Search
CPC . F01N 3/025; F01N 3/023; F01N 3/20; F01N 3/035; F01N 3/2033; F01N 3/208;
(Continued)

(56) References Cited

U.S. PATENT DOCUMENTS 5,067,320 A * 11/1991 Kanesaki ................ F01N 3/025
422/169
5,417,059 A *  5/1995 Hartel .................... F01N 3/025
60/276
(Continued)

FOREIGN PATENT DOCUMENTS

JP    2012-057517 A    3/2012
JP    2012-237282 A    12/2012
(Continued)

OTHER PUBLICATIONS

Partial Supplementary European Search Report dated Jun. 25, 2019, in connection with counterpart European Patent Application No. 17865209.5.
(Continued)

Primary Examiner — Matthew T Largi
(74) Attorney, Agent, or Firm — Hauptman Ham, LLP

(57) ABSTRACT

An exhaust gas post-processing system according to an embodiment of the present invention includes: an exhaust flow path for moving an exhaust gas discharged from an engine; at least one aftertreatment device installed on the exhaust flow path and purifying the exhaust gas; a burner installed on the exhaust flow path and heating the exhaust gas upstream of the at least one aftertreatment device; a fuel supplier for supplying a fuel to the burner; and an air supply flow path for supplying an air to the burner. The air supply flow path supplies a part of the exhaust gas discharged from the engine as the air to the burner.

10 Claims, 8 Drawing Sheets

(51) Int. Cl.
*F01N 3/035* (2006.01)
*F01N 3/023* (2006.01)
(52) U.S. Cl.
CPC ........... *F01N 3/208* (2013.01); *F01N 3/2033* (2013.01); *F01N 2240/14* (2013.01); *F01N 2240/28* (2013.01); *F01N 2610/1453* (2013.01)
(58) Field of Classification Search
CPC .............. F01N 2240/14; F01N 2240/28; F01N 2610/1453
See application file for complete search history.

(56) References Cited

U.S. PATENT DOCUMENTS

| | | | | |
|---|---|---|---|---|
| 5,617,720 | A * | 4/1997 | Achleitner | F01N 9/00 60/274 |
| 6,843,966 | B1 * | 1/2005 | Mahr | F02B 37/18 422/172 |
| 2005/0150215 | A1 * | 7/2005 | Taylor, III | F01N 3/303 60/295 |
| 2011/0283685 | A1 | 11/2011 | Kotrba et al. | |
| 2012/0011835 | A1 * | 1/2012 | Khadiya | F01N 3/025 60/303 |
| 2016/0228816 | A1 | 8/2016 | Slone et al. | |

FOREIGN PATENT DOCUMENTS

| | | |
|---|---|---|
| JP | 2014-001664 A | 1/2014 |
| KR | 10-2013-0070902 A | 6/2013 |
| KR | 20150131866 A * | 11/2015 |
| KR | 10-1582625 B1 | 1/2016 |

OTHER PUBLICATIONS

International Search Report dated Feb. 7, 2018, corresponding to International Application No. PCT/KR2017/011878.

* cited by examiner

EXHAUST GAS POST-PROCESSING SYSTEM

TECHNICAL FIELD

Embodiments of the present invention relate to an exhaust gas post-processing system, and more particularly, to an exhaust gas post-processing system for aftertreating an exhaust gas discharged from an engine.

BACKGROUND ART

In general, various power devices, e.g., diesel engines used in vehicles, ships, or plants, generate exhaust gases. However, there is a global tendency that the exhaust gas discharged from a power device is regulated. Accordingly, the exhaust gas generated in the power device is discharged through an exhaust gas post-processing system (e.g., an exhaust gas post-processing system).

The exhaust gas post-processing system includes, for example, a diesel particulate filter (DPF) for removing particulate matter (PM), and a selective catalytic reduction (SCR) reactor for reducing nitrogen oxide ($NO_x$).

The diesel particulate filter (DPF) removes particulate matter, such as soot, from the exhaust gas of a diesel engine by a method of collecting the particulate matter in the filter, and thus the particulate matter trapped in the filter gradually increases as an operation time of the engine elapses. Thus, it is necessary to perform a regeneration operation periodically, whereby the particulate matter collected in the diesel particulate filter is burned. For example, the diesel particulate filter is regenerated by raising a temperature of the exhaust gas flowing into the diesel particulate filter and thereby burning the particulate matter trapped in the diesel particulate filter.

In addition, as the particulate matter is collected in the diesel particulate filter, a back pressure of the engine increases, thus lowering output and fuel efficiency of the engine. Further, if the regeneration operation is performed in a state where the particulate matter is excessively collected in the diesel particulate filter, the diesel particulate filter may be damaged due to excessive temperature rise during regeneration. Accordingly, a regeneration cycle of the diesel particulate filter should be properly managed.

Meanwhile, when the diesel engine is operated in a low speed or low load condition, since the temperature of the exhaust gas is low, it is difficult to maintain the temperature of the exhaust gas at a temperature required for regeneration of the diesel particulate filter. In such a case, there has been a difficulty in that the vehicle or equipment should be driven under a different condition for regeneration of the diesel particulate filter, out of normal driving or operating conditions.

Accordingly, in order to prevent soot from being excessively accumulated in the diesel particulate filter, or to increase the reliability of regeneration of the diesel particulate filter, it is required to maintain the temperature of the exhaust gas to be sufficient for regeneration even in a low load condition, thus allowing unconstrained regeneration of the diesel particulate filter during driving.

In addition, as the environmental regulations are being strengthened recently, a technology for reducing nitrogen oxide contained in the exhaust gas is also applied to a power device. For example, there is a selective catalytic reduction (SCR) system as a technique for reducing nitrogen oxide contained in the exhaust gas.

The selective catalytic reduction system allows the exhaust gas, along with a reducing agent, to pass through a reactor provided with a catalyst therein, so that the nitrogen oxide contained in the exhaust gas and the reducing agent may react with each other, and may be reduced into nitrogen and water vapor. In such a case, ammonia ($NH_3$) may be directly used as the reducing agent, or ammonia produced by decomposing urea may be used.

In addition, the selective catalytic reduction system largely utilizes a high temperature active catalyst that has an activation temperature ranging from about 250° C. to about 350° C., in consideration of economical efficiency and radioactivity regulation. As used herein, the activation temperature refers to a temperature at which the catalyst may stably cause reduction of the nitrogen oxide without being poisoned. When the catalyst reacts outside the activation temperature range, the activity of the catalyst is continuously lowered as the catalyst is poisoned. Particularly, in a case where an exhaust gas that has a relatively low temperature of less than about 250° C. is introduced into a reactor provided with a high temperature active catalyst, sulfur oxide ($SO_x$) of the exhaust gas reacts with ammonia ($NH_4$), which is a reducing agent, to produce a catalyst poisoning substance. The catalyst poisoning substance may include at least one of ammonium sulfate ($NH_4)_2SO_4$ and ammonium bisulfate ($NH_4HSO_4$), for example. When the catalyst is poisoned as described above, efficiency of reducing nitrogen oxide (NO) is degraded. Accordingly, it is also necessary to maintain the temperature of the exhaust gas at the activation temperature of the catalyst.

In addition, the selective catalytic reduction system uses ammonia ($NH_3$) as a representative reducing agent for reducing nitrogen oxide.

Since ammonia is not easy to store and supply, ammonia that is generated by decomposition of urea when a urea aqueous solution is injected into an exhaust pipe is used as the reducing agent.

However, when a urea aqueous solution is directly injected to the exhaust gas having a temperature of less than about 250° C., there has been a problem that the nozzle is clogged or the flow of the exhaust gas is interrupted due to by-products, such as biuret, cyanuric acid, melamine, and ammeline, or urea deposits.

Accordingly, techniques for further raising the temperature of the exhaust gas discharged from the diesel engine have been developed to improve the reliability of regeneration of the diesel particulate filter and to ensure stable operation of the selective catalytic reduction system. Up to now, the techniques for additionally raising the temperature the exhaust gas may raise the temperature by installing a separate device, e.g., a burner, or supplying additional fuel to the engine, thus causing problems of, for example, an increase in manufacturing costs or degradation in fuel efficiency. Especially, when the burner is used, there has been a problem that it is difficult to apply the burner to, for example, vehicles, construction machines, or ships which have a limited installation space due to the accompanying devices.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

DETAILED DESCRIPTION OF INVENTION

Technical Problem

Aspects of embodiments of the present invention may be directed to an exhaust gas post-processing system capable of effectively aftertreating an exhaust gas.

Solution to Problem

According to an embodiment of the present invention, an exhaust gas post-processing system for aftertreating an exhaust gas discharged from an engine includes: an exhaust flow path for moving the exhaust gas discharged from the engine; at least one aftertreatment device installed on the exhaust flow path and purifying the exhaust gas; a burner installed on the exhaust flow path and heating the exhaust gas upstream of the at least one aftertreatment device; a fuel supplier for supplying a fuel to the burner; and an air supply flow path for supplying an air to the burner. The air supply flow path supplies a part of the exhaust gas discharged from the engine as the air to the burner.

An oxygen concentration of the air supplied to the burner may be in a range from about 8% to about 16%, and the burner may be a high ignition energy burner.

The high ignition energy burner may be a plasma burner using plasma reaction.

The air supply flow path may branch from the exhaust flow path upstream of the burner, and supply the part of the exhaust gas to the burner.

The exhaust gas post-processing system may further include an air supply valve installed on the air supply flow path including a branch point between the air supply flow path and the exhaust flow path. The exhaust gas discharged from the engine may flow to the at least one aftertreatment device via a turbo charger, and the air supply flow path may branch from the exhaust flow path in back of the turbo charger.

The exhaust gas post-processing system may further include an air supply valve installed on the air supply flow path including a branch point between the air supply flow path and the exhaust flow path. The exhaust gas discharged from the engine may flow to the at least one aftertreatment device via a turbo charger, and the air supply flow path may branch from the exhaust flow path in front of the turbo charger.

The exhaust gas post-processing system may further include a recirculation flow path for supplying the part of the exhaust gas discharged from the engine to the engine. The air supply flow path may branch from the recirculation flow path.

The fuel supplier may supply the fuel to the engine and the burner.

The at least one aftertreatment device may include a diesel particulate filter (DPF), and the burner may receive the fuel and the air from the fuel supplier and the air supply flow path during regeneration of the diesel particulate filter, and heat the exhaust gas.

The at least one aftertreatment device may include a selective catalytic reduction reactor installed at the exhaust flow path downstream of the diesel particulate filter, and a reducing agent supplier installed at the exhaust flow path between the selective catalytic reduction reactor and the diesel particulate filter, may further include an auxiliary burner installed between the reducing agent supplier and the diesel particulate filter, and may be capable of heating the exhaust gas that flows to the selective catalytic reduction reactor, separately from the diesel particulate filter, by using the auxiliary burner.

The at least one aftertreatment device may include a selective catalytic reduction reactor, and a reducing agent supplier that injects a reducing agent at the exhaust flow path upstream of the selective catalytic reduction reactor. The burner may receive the fuel and the air from the fuel supplier and the air supply flow path, and heat the exhaust gas, when heating of the selective catalytic reduction reactor is needed.

The at least one aftertreatment device may further include a diesel particulate filter, and the diesel particulate filter may be incorporated in the selective catalytic reduction reactor.

The at least one aftertreatment device may include at least one of a diesel oxidation catalyst (DOC) device installed on the exhaust flow path and a diesel particulate filter installed downstream of the diesel oxidation catalyst device and a selective catalytic reduction reactor.

The foregoing is illustrative only and is not intended to be in any way limiting. In addition to the illustrative aspects, exemplary embodiments and features described above, further aspects, exemplary embodiments and features will become apparent by reference to the drawings and the following detailed description.

Advantageous Effects of Invention

According to exemplary embodiments of the present invention, an exhaust gas may be efficiently heated with a simple structure. Further, since the exhaust gas may be easily heated even under a low speed or low load condition, purifying efficiency of the exhaust gas post-processing system may be improved.

BRIEF DESCRIPTION OF THE DRAWINGS

A more complete appreciation of the present invention will become more apparent by describing in detail exemplary embodiments thereof with reference to the accompanying drawings, wherein.

DESCRIPTION OF EXEMPLARY EMBODIMENTS

Figure 1:
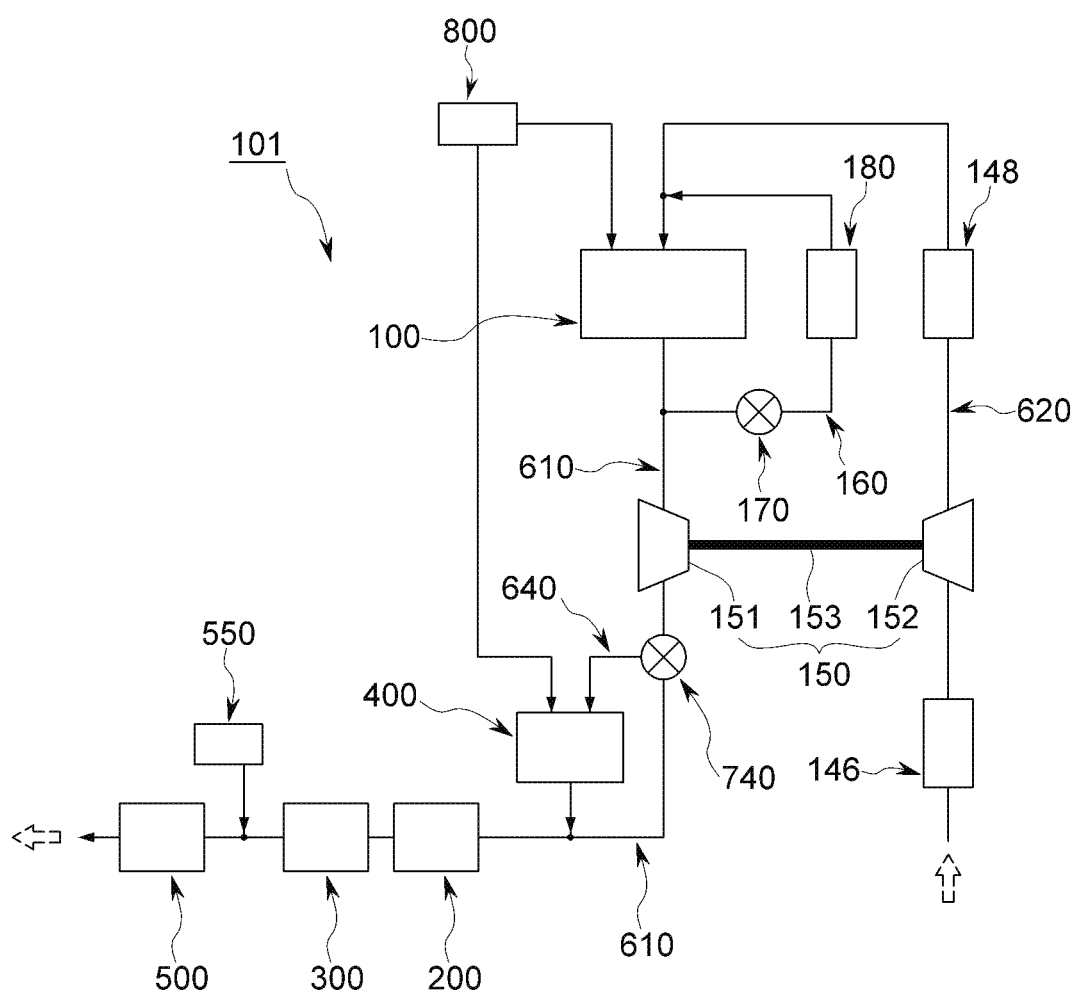
FIG. 1 is a configuration diagram illustrating an exhaust gas post-processing system according to a first embodiment.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the present invention is not limited to the exemplary embodiments and should be construed as including all the changes, equivalents and substitutions included in the spirit and scope of the present invention.

In addition, in various exemplary embodiments, components having the same configuration are represented by the same reference symbols in a first embodiment, and in other exemplary embodiments, only the configurations different from those of the first embodiment will be described.

It should be understood that the drawings are schematic and they are not drawn to scale. The relative dimensions and ratios of the components illustrated in the drawings are exaggerated or reduced in size for clarity and convenience of illustration in the drawings, and the dimensions are merely illustrative and not restrictive. The same reference numerals are used for the same structure, element or component appearing in more than one drawing to denote similar features.

The exemplary embodiments of the present invention specifically illustrate ideal exemplary embodiments of the present invention. Accordingly, various variations or modifications of the illustration are expected. Thus, the exemplary embodiments are not limited to any particular form of the depicted area, but include modifications of the form, for example, by manufacturing.

Hereinafter, an exhaust gas post-processing system 101 according to a first embodiment of the present invention will be described with reference to FIG. 1.

Although a diesel engine 100 for a construction machine is exemplarily shown in FIG. 1 as a source for exhausting an exhaust gas, the first embodiment of the present invention is not limited thereto. That is, the first embodiment of the present invention may be applied to various power devices.

In addition, the diesel engine 100 exhausts an exhaust gas including environmental regulating substances, e.g., particulate matter (PM) and nitrogen oxide ($NO_x$).

In addition, as illustrated in FIG. 1, the exhaust gas discharged from the diesel engine 100 may be discharged through a turbo charger 150.

The turbo charger 150 rotates a turbine 151 with a pressure of the exhaust gas discharged from the diesel engine 100 to compress a new outside air and supply it to the diesel engine 100, thereby improving output of the diesel engine 100. As the exhaust gas discharged from the diesel engine 100 passes through the turbo charger 150, a temperature and a pressure of the exhaust gas are reduced.

In specific, the turbo charger 150 includes the turbine 151 installed on an exhaust flow path 610 and rotated by the pressure of the exhaust gas, a compressor 152 installed on an intake flow path 620 and pushing an air into the diesel engine 100 by a rotational force of the turbine 151, and a shaft 153 for connecting the turbine 151 and the compressor 152 to transmit a rotational power.

In addition, the turbo charger 150 may further include an air cleaner 146 for removing impurities of the outside air supplied to the diesel engine 100, and an intercooler 148 for lowering a temperature of the air compressed by the compressor 152 of the turbo charger 150.

In addition, as illustrated in FIG. 1, an exhaust gas recirculation ("EGR") system may be applied to the diesel engine 100.

The EGR system returns a part of the exhaust gas, discharged from the diesel engine 100, back to the intake flow path 620 for supplying an intake air to a cylinder of the diesel engine 100 so as to lower a combustion temperature of the diesel engine 100 and reduce producing of nitrogen oxide ($NO_x$).

For example, the EGR system may include a recirculation flow path 160 for connecting the exhaust flow path 610 and the intake flow path 620, a recirculation valve 160 installed on the recirculation flow path 160 and regulating a recirculation rate of the exhaust gas, and a recirculation cooler 180 installed on the recirculation flow path 160 and lowering a temperature of a recirculated exhaust gas.

In order to supply the recirculated exhaust gas to the diesel engine 100, it is necessary to generate a pressure difference between the exhaust flow path 610 and the intake flow path 620 so that the exhaust gas may flow along the recirculation flow path 160. That is, as the pressure difference between the exhaust flow path 610 and the intake flow path 620 increases, efficiency of the EGR system increases.

As illustrated in FIG. 1, the exhaust gas post-processing system 101 according to the first embodiment of the present invention includes the exhaust flow path 610, a burner 400, an air supply flow path 640, and at least one aftertreatment device. As used herein, the at least one aftertreatment device is a device for purifying the exhaust gas, including, for example, a diesel particulate filter ("DPF") 300, a diesel oxidation catalyst ("DOC") device 200, a selective catalytic reduction ("SCR") reactor 500, and a reducing agent supplier 550.

The exhaust flow path 610 is connected to an exhaust outlet of the diesel engine 100, which is the power device described above, to exhaust the exhaust gas of the diesel engine 100. That is, the exhaust gas discharged from the diesel engine 100 flows along the exhaust flow path 610.

The DPF 300 is installed on the exhaust flow path 610 to physically collect particulate matter in the exhaust gas and to burn and remove the particulate matter.

However, since the DPF 300 removes the particulate matter, such as soot, in the exhaust gas of the diesel engine 100, in a collecting manner, the particulate matter collected in the DPF 300 gradually increases as an operation time of the diesel engine 100 elapses. Accordingly, it is necessary to periodically perform a regeneration operation in which the particulate matter collected in the DPF 300 is burned. For example, the DPF 300 may be regenerated by raising a temperature of the exhaust gas that is introduced into the DPF 300, and thus burning the particulate matter trapped in the DPF 300. The temperature of the exhaust gas required for regeneration of the DPF 300 may be in a range from about 500° C. to about 650° C.

In addition, as the particulate matter is trapped in the DPF 300, a back pressure of the diesel engine 100 may increase and an output and a fuel efficiency of the diesel engine 100 may be degraded. If the regeneration operation is carried out in a state where the particulate matter is excessively collected in the DPF 300, the DPF 300 may be damaged due to an excessive temperature rise during regeneration. Accordingly, a regeneration cycle of the DPF 300 needs to be properly set. In order to identify such regeneration conditions, a separate sensor (not illustrated) may be provided in the DPF 300 or upstream and/or downstream of the DPF 300. Such a separate sensor may include, for example, a temperature sensor and a pressure sensor, and it may be used to determine whether to regenerate by measuring the temperature or pressure of the exhaust gas passing through the DPF 300.

The SCR reactor 500 is installed on the exhaust flow path 610 in back of the DPF 300. As used herein, the term "front"

means an upstream direction with respect to a flowing direction of a fluid, and the term "back" means a downstream direction with respect to the flowing direction of the fluid.

That is, the SCR reactor 500 receives the exhaust gas that has passed through the DPF 300 via the exhaust flow path 610. The SCR reactor 500 includes a catalyst for reducing the nitrogen oxide ($NO_x$) contained in the exhaust gas. The catalyst promotes a reaction of a reducing agent with the nitrogen oxide ($NO_x$) contained in the exhaust gas, and reduces the nitrogen oxide ($NO_x$) into nitrogen and water vapor.

In addition, in the first embodiment of the present invention, the catalyst provided in the SCR reactor 500 may be arranged in a multi-layer structure based on the flowing direction of the exhaust gas. That is, the catalyst may be provided in the form of a plurality of catalyst modules, and the plurality of catalyst modules may be arranged along the flowing direction of the exhaust gas.

The catalyst may be formed of a variety of materials known to those skilled in the art, such as zeolite, vanadium, and platinum. In one example, the catalyst may have an activation temperature in a range from about 250° C. to about 350° C. As used herein, the activation temperature refers to a temperature at which the catalyst may stably cause reduction of nitrogen oxide without being poisoned. When the catalyst reacts outside the activation temperature range, the catalyst may be poisoned and the performance and efficiency may be lowered.

For example, when a reduction reaction occurs to reduce the nitrogen oxide contained in the exhaust gas at a relatively low temperature of about 150° C. or higher and less than about 250° C., ammonia ($NH_3$) and sulfur oxide ($SO_x$) of the exhaust gas react with each other to produce catalyst poisoning substances.

Specifically, the poisoning substance that poisons the catalyst may include at least one of ammonium sulfate (($NH_4)_2SO_4$) and ammonium bisulfate ($NH_4HSO_4$), for example. Such a catalyst poisoning substance is adsorbed to the catalyst to lower the activity of the catalyst. Since the catalyst poisoning substance is decomposed at a relatively high temperature, i.e., at a temperature ranging from about 350° C. to about 450° C., the poisoned catalyst may be regenerated by raising a temperature of the catalyst in the SCR reactor 500. A separate sensor (not illustrated) may be installed to determine the temperature rise of the catalyst. Such a separate sensor may be installed in front of or in back of the SCR reactor 500 to measure the pressure and temperature of the exhaust gas or installed downstream of the SCR reactor 500 to measure a concentration of nitrogen oxide ($NO_x$) of the exhaust gas.

Ammonia ($NH_3$) is used as the reducing agent. In the first embodiment of the present invention, a reducing agent supplier 550, to be described below, supplies urea ($CO(NH_2)_2$) which is a reducing agent precursor. In such an embodiment, urea ($CO(NH_2)_2$) may be injected in the form of an aqueous solution by the reducing agent supplier 550. Urea ($CO(NH_2)_2$) is hydrolyzed or pyrolyzed to produce ammonia ($NH_3$) and isocyanic acid ($HNCO$). Then, isocyanic acid ($HNCO$) is decomposed again into ammonia ($NH_3$) and carbon dioxide ($CO_2$). That is, in the first embodiment of the present invention, urea is decomposed to generate ammonia that serves as a reducing agent to react with nitrogen oxide.

The reducing agent supplier 550 injects the reducing agent, i.e., the urea aqueous solution, to the exhaust gas that flows along the exhaust flow path 610 on the exhaust flow path 610 in front of the SCR reactor 500.

The DOC device 200 is installed on the exhaust flow path 610 in front of the DPF 300.

The DOC device 200 primarily functions to oxidize nitrogen monoxide (NO) to nitrogen dioxide ($NO_2$). It is important to increase a ratio of nitrogen dioxide ($NO_2$) in the nitrogen oxide ($NO_x$) contained in the exhaust gas in order to efficiently reduce nitrogen oxide ($NO_x$) in the SCR reactor 500.

In addition, the DOC device 200 may also reduce carbon monoxide (CO) and hydrocarbon (HC) and reduce particulates contained in the exhaust gas by burning hydrocarbon (HC) contained in the exhaust gas. As such, the particulate matter collected in the DPF 300 may be reduced as the DOC device 200 burns hydrocarbon (HC), and thus a regeneration cycle of the DPF 300 may be increased.

In an embodiment, the DOC device 200 starts an exothermic reaction when it reaches a predetermined temperature. For example, the predetermined temperature may range from about 170° C. to about 200° C. A separate sensor (not illustrated) may be provided downstream of the DOC device 200 to detect a temperature rise of the exhaust gas due to the exothermic reaction.

The burner 400 burns a fuel to heat the exhaust gas flowing along the exhaust flow path 610 toward the DPF 300. As an example, the burner 400 may be an oil burner or a plasma burner.

According to a preferred embodiment, the burner 400 may be driven during regeneration of the DPF 300. The burner 400 may heat the exhaust gas so that a temperature of the catalyst provided in the SCR reactor 500 may maintain the activation temperature, or may heat the exhaust gas so that the poisoned catalyst may be regenerated. The burner 400 may also be used to raise the temperature of the exhaust gas to a temperature range within which the urea injected by the aforementioned reducing agent supplier 550 may be pyrolyzed or hydrolyzed. The temperature of the exhaust gas may be raised by the burner 400 in a manner that a control unit (not illustrated) that is input with the temperature/pressure of the exhaust gas from the aforementioned sensors controls a fuel supplier 800, an air supply valve 740, and the burner 400. Such a control unit may be separately provided to control the burner 400, or may be provided in the form of sharing an engine control unit (ECU) for controlling an amount of fuel to be supplied to a combustion chamber of the diesel engine 100 or a control unit for controlling other electrical components.

The fuel supplier 800 may be configured to be used solely for the burner 400, or to supply fuel to both the diesel engine 100 and the burner 400. According to the first embodiment shown in FIG. 1, the fuel supplier 800 is exemplified to share a fuel tank (not illustrated) that stores a fuel to be supplied to the combustion chamber of the diesel engine 100.

Referring to FIG. 1, the fuel supplier 800 may supply the fuel to the burner 400 when the DPF 300 is regenerated. In addition, the fuel supplier 800 may also supply the fuel to the burner 400 when the burner 400 heats the exhaust gas so that the temperature of the catalyst provided in the SCR reactor 500 may maintain the activation temperature, heats the exhaust gas to regenerate the catalyst, or raises the temperature of the exhaust gas to be within a temperature range in which the urea injected by the reducing agent supplier 550 may be pyrolized or hydrolyzed.

The air supply flow path 640 branches from the exhaust flow path 610 and supplies a part of the exhaust gas discharged from the diesel engine 100 to the burner 400. In particular, in the first embodiment of the present invention, the air supply flow path 640 branches from the exhaust flow path 610 in back of the turbo charger 150.

The air supply valve 740 may be installed on the air supply flow path 640 or at a branch point of the air supply flow path 640 from the exhaust flow path 610. Referring to FIG. 1, the air supply valve 740 may be opened so that a part of the exhaust gas is supplied to the burner 400 when the DPF 300 is regenerated. The exhaust gas supplied through the air supply valve 740 is mixed with the exhaust gas supplied through the fuel supplier 800 and supplied to the burner 400 and burned. The air supply valve 740 may be opened to supply air necessary for combustion of the burner 400 when the burner 400 heats the exhaust gas so that the temperature of the catalyst provided in the SCR reactor 500 may maintain the activation temperature, heats the exhaust gas to regenerate the catalyst, or raises the temperature of the exhaust gas to be within a temperature range that may be pyrolized or hydrolyzed.

As illustrated in FIG. 1, when the DOC device 200 capable of performing an exothermic reaction as described above is installed in front of the DPF 300, the exhaust gas may be heated to a temperature at which the exothermic reaction of the DOC device 200 is promoted. That is, it is not necessary that the burner 400 directly raise the temperature of the exhaust gas to a temperature at which the DPF 300 may be regenerated, and the burner 400 may only heat the exhaust gas to a temperature at which the exothermic reaction of the DOC device 200 is promoted. For example, the burner 400 does not need to raise the temperature of the exhaust gas to a range from about 500° C. to about 650° C., and even though it is raised to a range from about 170° C. to about 200° C., the DPF 300 may be regenerated by the DOC device 200.

With such a configuration, the exhaust gas post-processing system 101 according to the first embodiment of the present invention may purify the exhaust gas efficiently.

Figure 2:
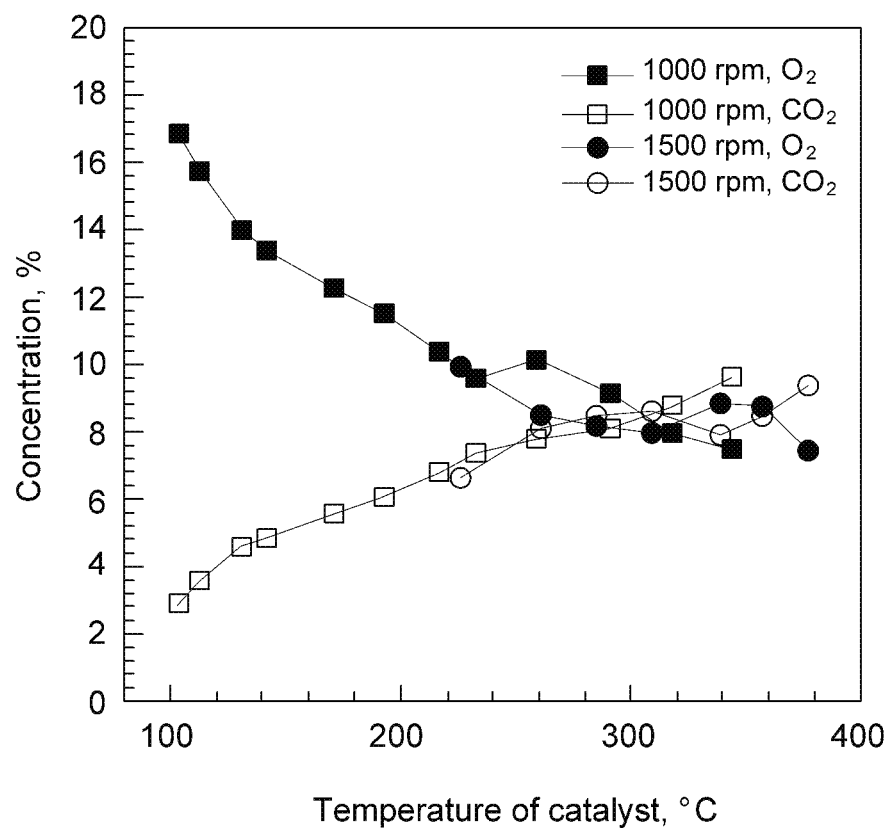
FIG. 2 is a graph showing a concentration of oxygen in an exhaust gas discharged from a diesel engine.

As illustrated in FIG. 2, an oxygen concentration of the exhaust gas discharged from the diesel engine 100 and flowing along the exhaust flow path 610 is in a range from about 8% to about 16%, which is much lower than the oxygen concentration in atmosphere of about 21%. This is because the exhaust gas is an air which is discharged after a large amount of oxygen is consumed while being burned in the combustion chamber of the engine. When using an oil burner that utilizes a spark of a spark plug for ignition, the oxygen concentration of such an environment is less than the minimum oxygen concentration required for ignition, as shown in Table 1, and thus ignition does not normally occur in such an environment. That is, it is the environment where ignition cannot substantially occur despite the supply of fuel, if the oxygen concentration is not increased.

TABLE 1

| Burner | Fuel-air equivalence ratio | Air to fuel ratio | Oxygen concentration (%) |
|---|---|---|---|
| Driving range of oil burner | Max. 1.2 | Min. 12.2 | Min. 17.5 |
| Driving range of high ignition energy burner | Max. 3.5 | Min. 4.2 | Min. 6.0 |

In order to address such an issue, in the present embodiment of the present invention, a high ignition energy burner is used as the burner 400. As used herein, the high ignition energy burner refers to burners having a high ignition energy, and it may initiate ignition even in an environment outside the ignition environment of oil burners. For example, as shown in Table 1, the high ignition energy burner is capable of igniting in the environment where an oxygen concentration of air supplied for ignition is in a range from about 6% to about 17.5%, a fuel-air equivalence ratio of the air is in a range from about 1.2 to about 3.5, and an air to fuel ratio is in a range from about 4.2 to about 12.2. The oxygen concentration, the fuel-air equivalence ratio, and the air to fuel ratio of the exhaust gas that is mixed with the fuel and then supplied to the burner 400 for combustion are respectively in the aforementioned ranges of condition where only the high ignition energy burners are capable of igniting.

In the present embodiment, a plasma burner capable of igniting by using a plasma reaction is used as a high ignition energy burner. In the case of an oil burner, a separate air or a compressed air supply system is required for the supply of oxygen required for fuel combustion. However, the plasma burner is capable of igniting only with the exhaust gas supplied through the air supply flow path 640 instead of the compressed air supply system. The use of such a plasma burner eliminates the need to separately provide a compressed air supply system for ignition and flame holding. By eliminating the use of the compressed air supply system, not only the overall configuration of the exhaust gas post-processing system 101 may be simplified, but also the efficiency of energy utilization may be improved by suppressing extra energy consumption for driving the compressed air supply system. It is difficult to install a separate compressed air supply system in, for example, vehicles, construction machines, and ships due to space limitations and manufacturing cost problems, but such an issue may be solved with the configuration of the present embodiment.

Hereinafter, an exhaust gas post-processing system 102 according to a second embodiment will be described with reference to FIG. 3.

Figure 3:
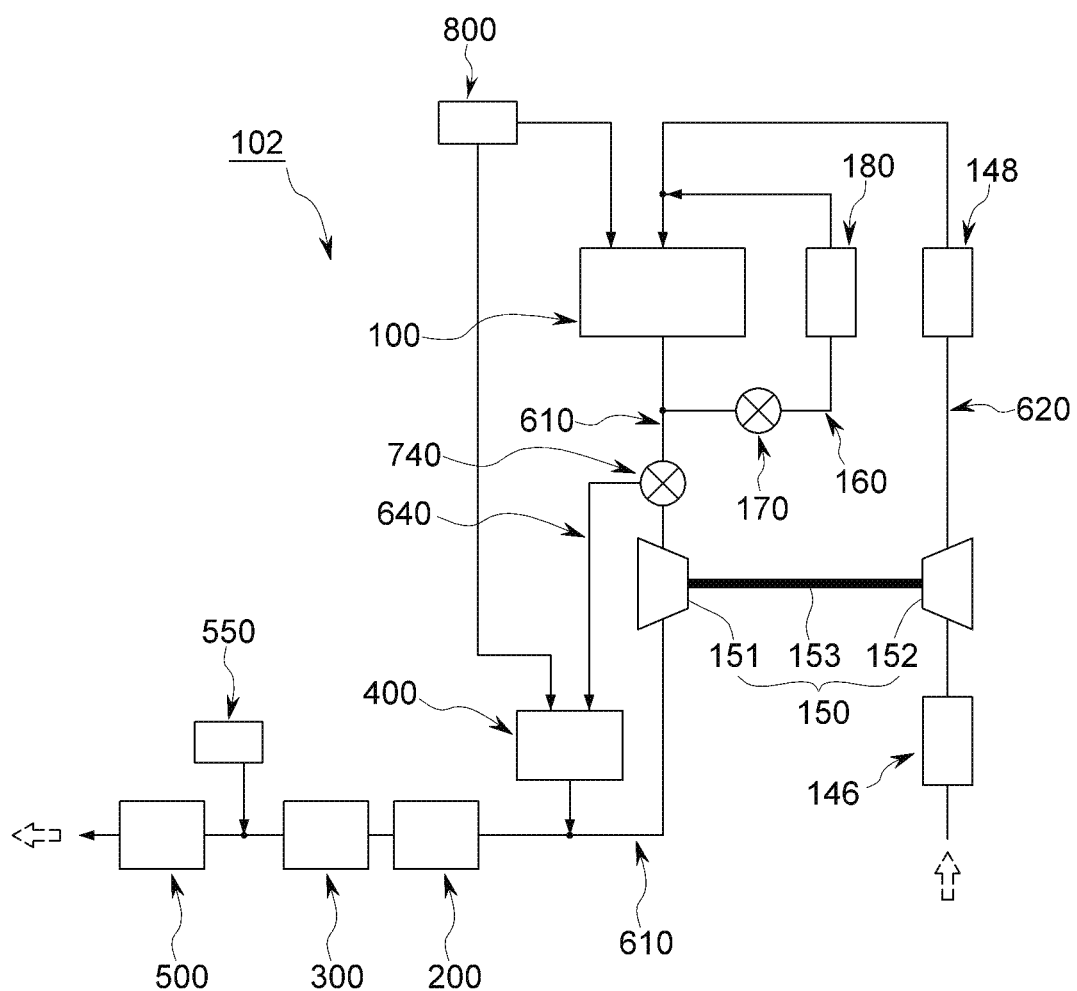
FIG. 3 is a configuration diagram illustrating an exhaust gas post-processing system according to a second embodiment.

In the exhaust gas post-processing system 102 according to the second embodiment illustrated in FIG. 3, the air supply flow path 640 branches from the exhaust flow path 610 in front of the turbo charger 150. That is, the second embodiment of the present invention is substantially the same as the first embodiment except that a position where the air supply flow path 640 branches from the exhaust flow path 610 is changed.

When the air supply flow path 640 branches from the exhaust flow path 610 in front of the turbo charger 150 as described above, an exhaust gas of a relatively high temperature and a relatively high pressure may be supplied to the burner 400, as compared to the case where it branches from the exhaust flow path 610 in back of the turbo charger 150. Accordingly, efficiency of the burner 400 may be improved. That is, a fuel consumed by the burner 400 to raise the temperature of the exhaust gas may be reduced. In such an embodiment, it may be necessary to control an amount of the exhaust gas supplied to the burner 400 through the air supply flow path 640 in consideration of a performance of the turbo charger 150, and it may be controlled through adjustment of the air supply valve 740.

With such a configuration, the exhaust gas post-processing system 102 according to the second embodiment may purify the exhaust gas more efficiently.

Hereinafter, an exhaust gas post-processing system 103 according to a third embodiment will be described with reference to FIG. 4.

Figure 4:
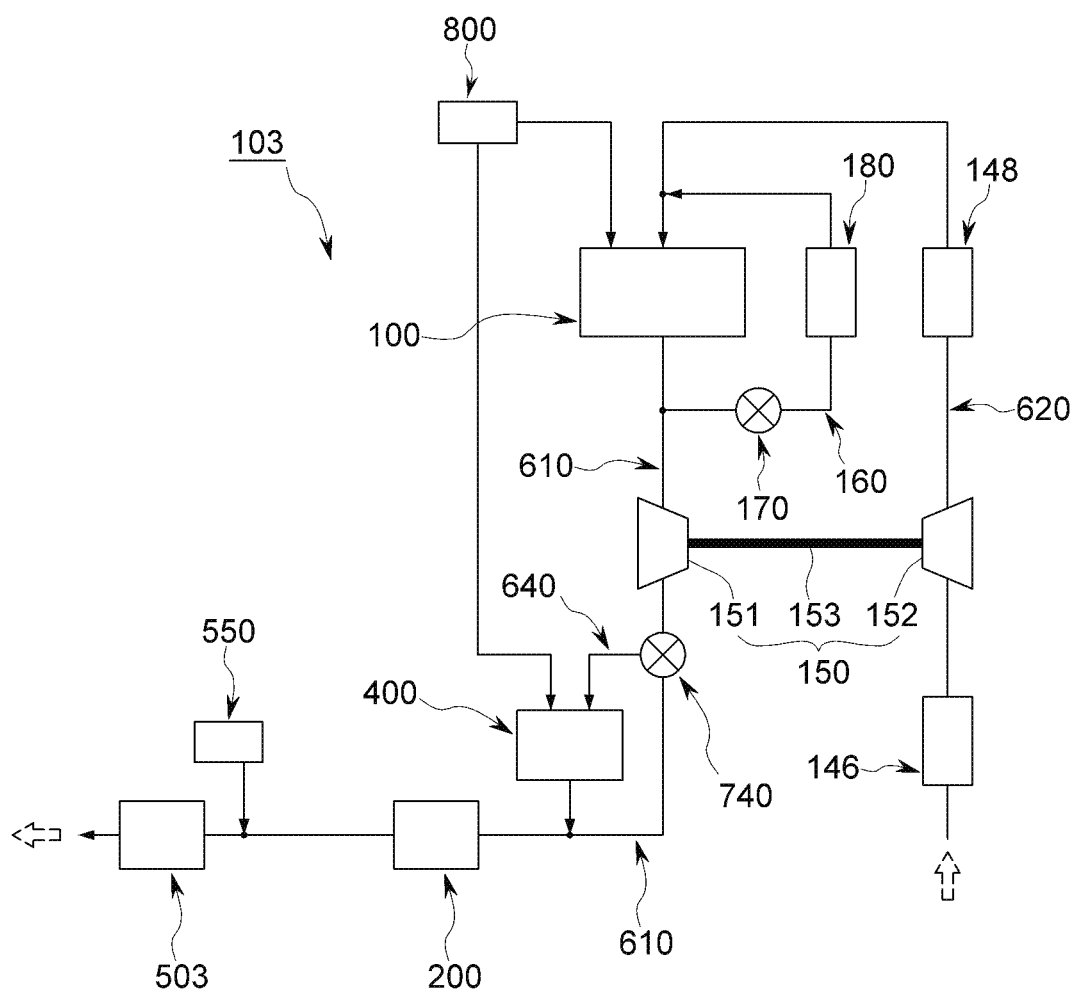
FIG. 4 is a configuration diagram illustrating an exhaust gas post-processing system according to a third embodiment.

In the exhaust gas post-processing system 103 illustrated in FIG. 4, a diesel particulate filter is incorporated in a SCR reactor 503. That is, the diesel particulate filter is not used in a separate manner, but is provided together with a catalyst inside the SCR reactor 503. In specific, a catalyst used in the SCR reactor 503 for the selective catalytic reduction reaction is coated over the diesel particulate filter.

The SCR reactor 503 in which the diesel particulate filter is incorporated has a high rate of utilizing passive regeneration rather than active regeneration by virtue of its characteristics.

In addition, when the regeneration operation is performed after a large amount of soot is collected in the incorporated diesel particulate filter, the catalyst may be exposed to an excessively high temperature environment and the catalyst may be damaged. Accordingly, passive regeneration is performed relatively frequently before a large amount of soot is accumulated.

Accordingly, when the SCR reactor 503 incorporating the diesel particulate filter is used, a greater efficiency may be expected since a utilization frequency of the burner 400 is increased under the condition that the temperature of the exhaust gas is relatively low, and there is substantially no need to provide a separate compressed air supply system for the burner 400 even through the utilization frequency of the burner 400 is relatively high.

In addition, when a separate compressed air supply system is used, a waiting time for air pressurization is required for continuous use. In the present embodiment, however, since a part of exhaust gas is received for use in lieu of the compressed air supply system, such a waiting time is not needed.

With such a configuration, the exhaust gas post-processing system 103 according to the third embodiment of the present invention may perform aftertreatment of the exhaust gas more efficiently.

Hereinafter, an exhaust gas post-processing system 104 according to a fourth embodiment will be described with reference to FIG. 5.

Figure 5:
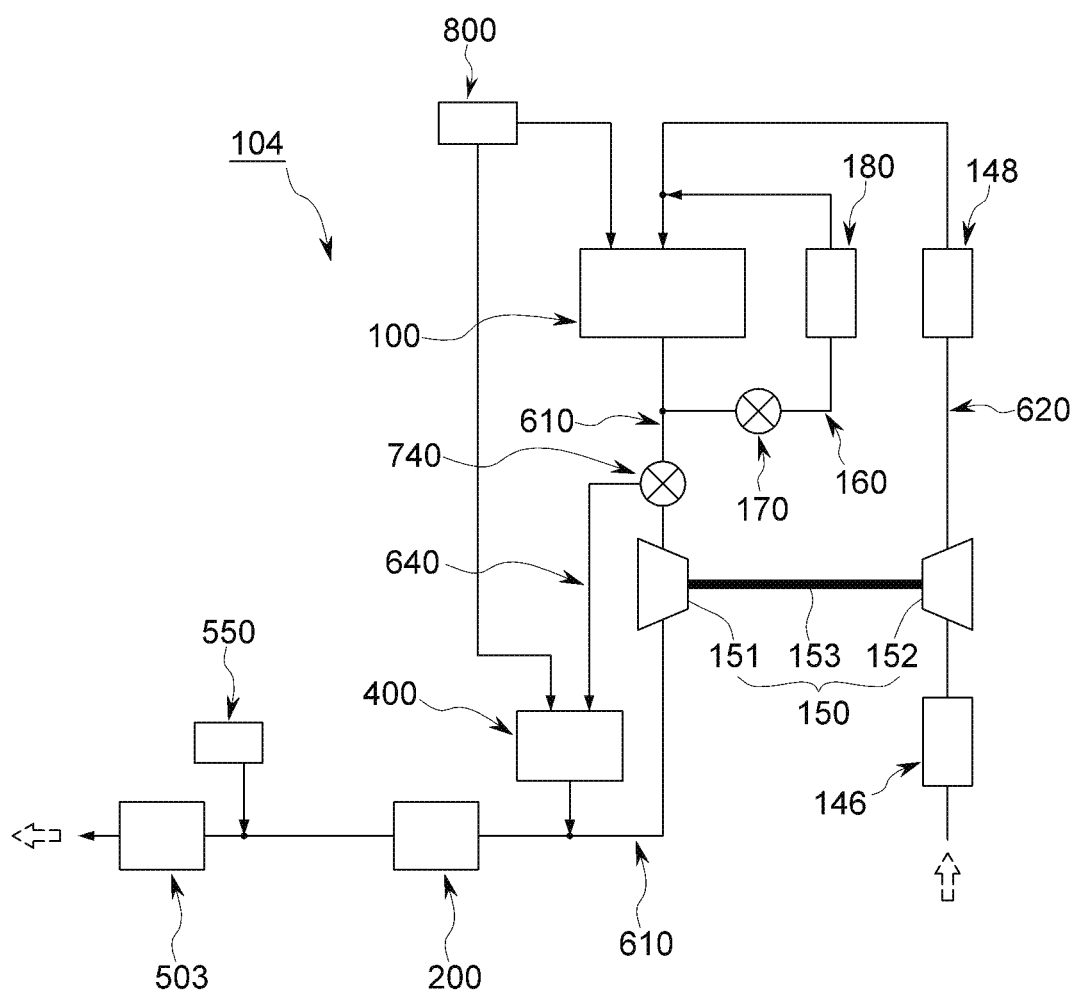
FIG. 5 is a configuration diagram illustrating an exhaust gas post-processing system according to a fourth embodiment.

Referring to FIG. 5, the exhaust gas post-processing system 104 according to the fourth embodiment is configured such that the air supply flow path 640 branches from the exhaust flow path 610 in front of the turbo charger 150, and a diesel particulate filter is incorporated in the SCR reactor 503.

With such a configuration, both of the advantages arising from the different branching position of the exhaust flow path 610 and from the diesel particulate filter being incorporated in the SCR reactor 503 may all be achieved, as described above.

Hereinafter, an exhaust gas post-processing system 105 according to a fifth embodiment will be described with reference to FIG. 6.

Figure 6:
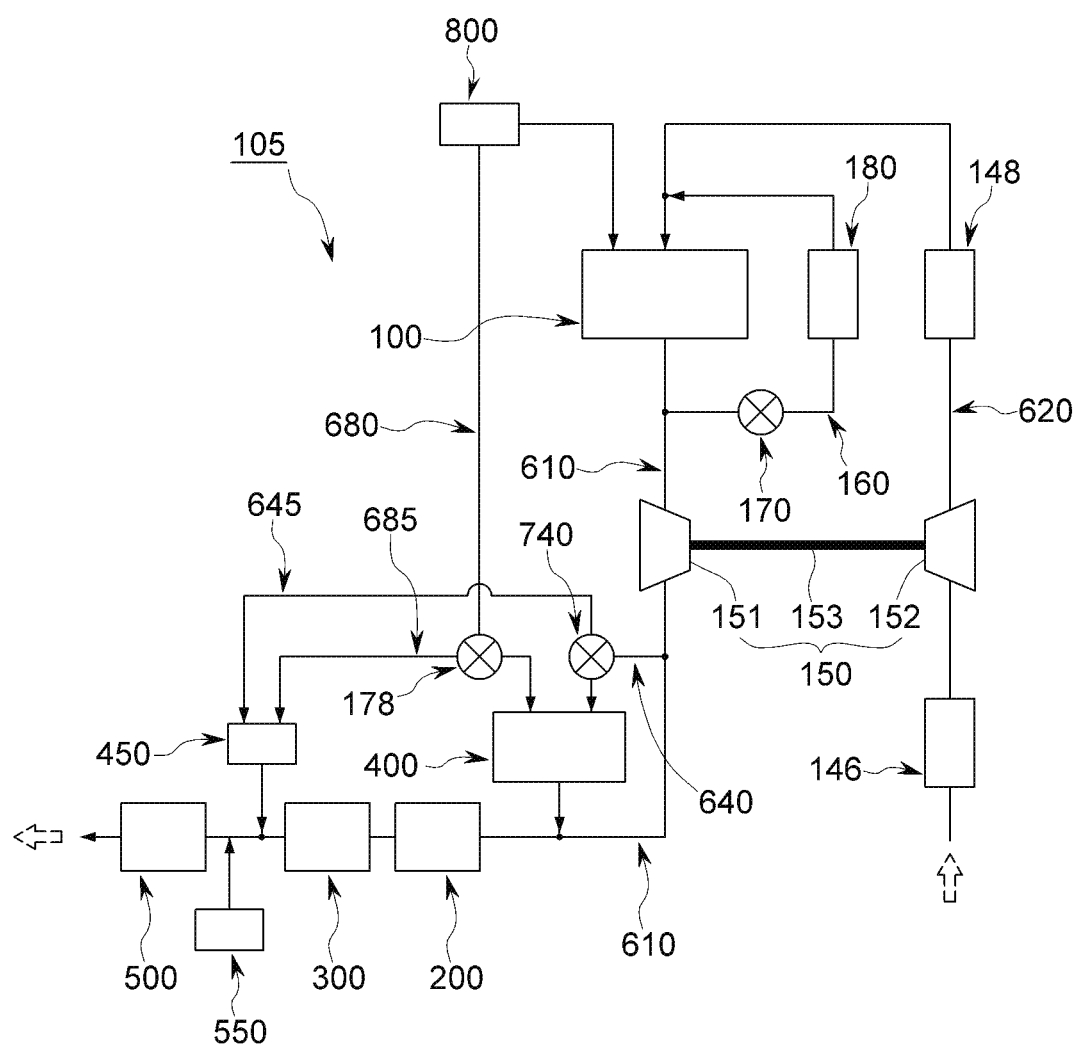
FIG. 6 is a configuration diagram illustrating an exhaust gas post-processing system according to a fifth embodiment.

Referring to FIG. 6, the exhaust gas post-processing system 105 may include the DOC device 200, the DPF 300, and the SCR reactor 500 as the at least one aftertreatment device. The DOC device 200, the DPF 300, and the SCR reactor 500 may be sequentially installed along the exhaust flow path 610. The burner 400 may be installed upstream of the DOC device 200. The burner 400 installed upstream of the DOC device 200 may include a plasma burner as described above, and may be installed, although not illustrated, upstream of the DPF 300 when the DOC device 200 is not provided.

In addition, a separate auxiliary burner 450 may be further installed between the DPF 300 and the SCR reactor 500. The separate auxiliary burner 450 may be used when regeneration of the DPF 300 is not needed but a temperature rise of the SCR reactor 500 is needed. As described above, the SCR reactor 500 may be heated relatively rapidly with a relatively less energy, when only the temperature of the SCR reactor 500 needs to be raised. For example, it may be utilized in various situations, for example, when the temperature of the SCR reactor 500 needs to be raised rapidly at the initial stage of startup. To this end, the separate auxiliary burner 450 may include a plasma burner installed upstream of the reducing agent supplier 550.

In order to raise only the temperature of the SCR reactor 500, it is also necessary to supply fuel and air to the separate auxiliary burners 450. The supply of fuel and air may be configured in various ways. For example, a fuel may be supplied through an additional fuel supply line 685 branching from a fuel supply line 680 that connects the burner 400 and the fuel supplier 800, as illustrated in FIG. 6. In such an embodiment, a fuel supply control valve 178 for controlling the fuel supply to the burner 400 and to the separate auxiliary burner 450 may be additionally provided.

In the present embodiment illustrated in FIG. 6, an air may be supplied through an additional air supply flow path 645 branching from the air supply flow path 640 for supplying the exhaust gas to the burner 400. In such an embodiment, the air supply valve 740 may be installed at a branch point between the air supply flow path 640 and the additional air supply flow path 645 so that the air supply to each of the burner 400 and the separate auxiliary burner 450 may be controlled.

With such a configuration, the exhaust gas post-processing system 105 according to the fifth embodiment of the present invention may substantially minimize additional equipment for the supply of fuel and air to the separate auxiliary burner 450, by only including the additional fuel supply line 685 and the additional air supply flow path 645.

Hereinafter, an exhaust gas post-processing system 106 according to a sixth embodiment will be described with reference to FIG. 7.

Figure 7:
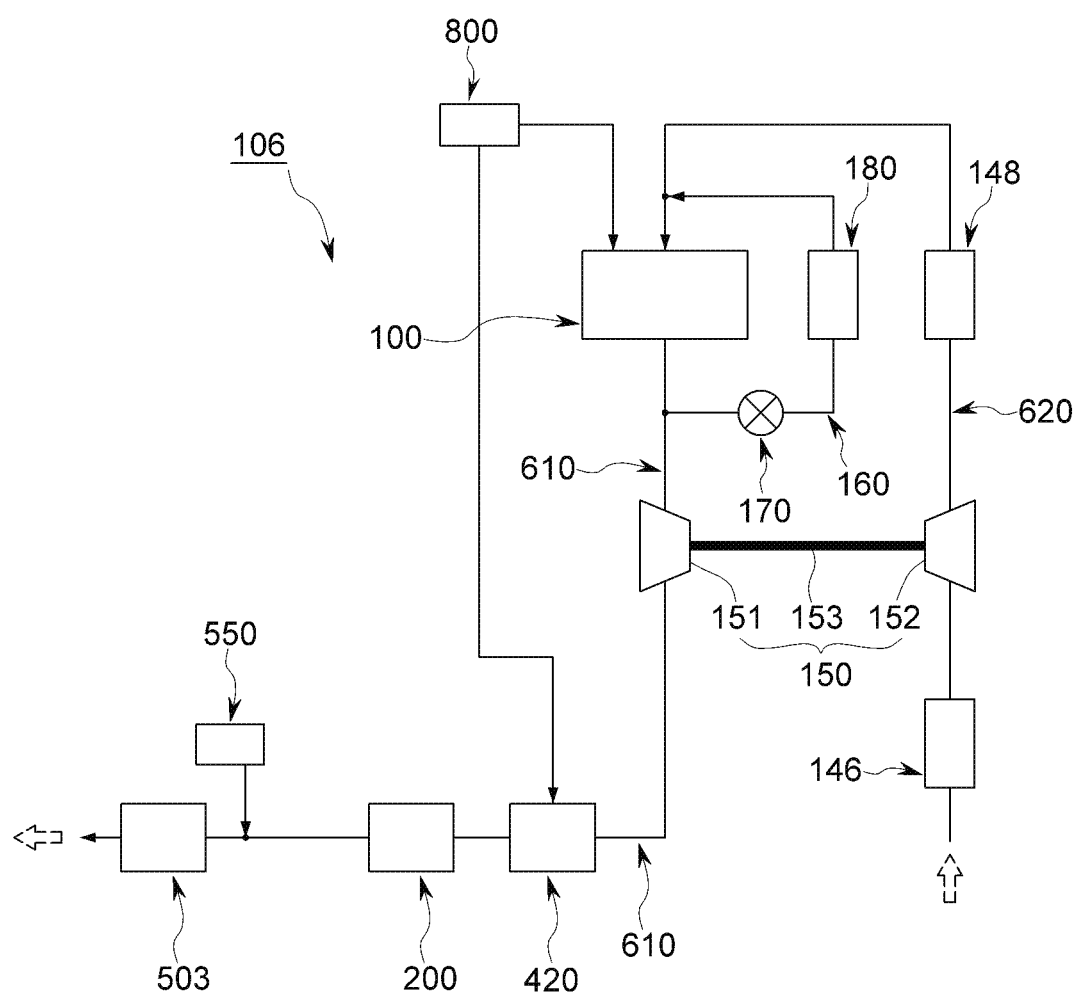
FIG. 7 is a configuration diagram illustrating an exhaust gas post-processing system according to a sixth embodiment.

As illustrated in FIG. 7, the exhaust gas post-processing system 106 may be configured such that a part or all of the exhaust gas of the exhaust flow path 610 flows into the at least one aftertreatment device after passing through the burner 420.

The fuel supplier 800 may be connected to the burner 420 so as to be able to supply fuel. An air supply flow path may be configured to allow the exhaust gas of the exhaust flow path 610 to be supplied to the burner 420 without a separate configuration. Alternatively, the exhaust gas on the upstream side of the burner 420 may be guided to the flame of the burner 420 to be concentrated therein without a separate air supply flow path. The exhaust gas may be guided by forming a guide shape that protrudes in the exhaust flow path 610 to guide the exhaust gas, or may be formed in a hole or tubular shape defined through a body of the burner 420, thus allowing the exhaust gas to pass through the body of the burner 420 and guided to the flame. In a case where the air supply flow path is formed in a shape passing through the burner 420, a valve corresponding to the air supply valve of the above-described exemplary embodiments may further be installed on the air supply flow path. Such a valve may selectively open and close the flow path corresponding to the driving of the burner 420. When the valve is opened, the exhaust gas may be supplied to the flame of the burner 420.

With such a configuration, the exhaust gas post-processing system 106 according to the sixth embodiment of the present invention may perform aftertreatment of the exhaust gas with a simpler structure.

Hereinafter, an exhaust gas post-processing system 107 according to a seventh embodiment will be described with reference to FIG. 8.

Figure 8:
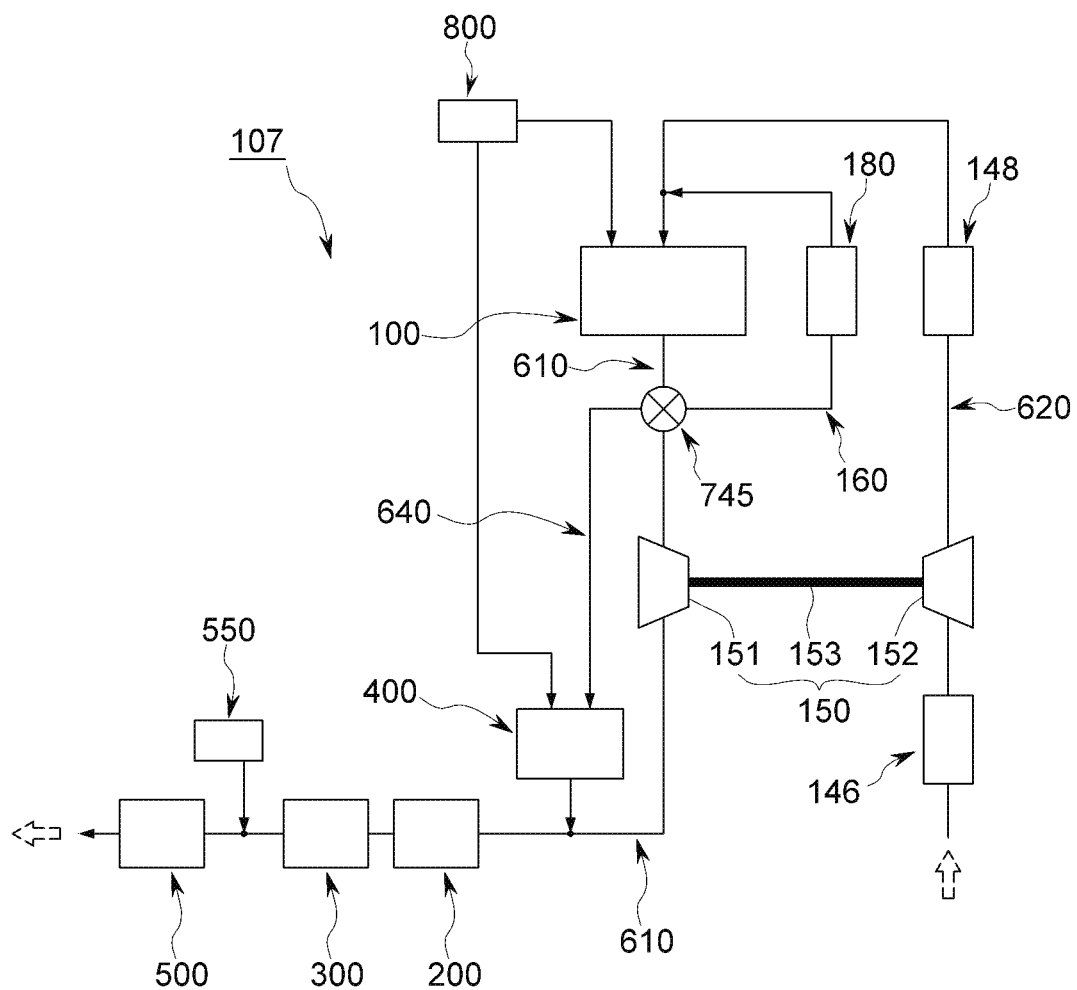
FIG. 8 is a configuration diagram illustrating an exhaust gas post-processing system according to a seventh embodiment.

As illustrated in FIG. 8, in the seventh embodiment, the air supply flow path 640 and the recirculation flow path 160 may be connected to each other so that the exhaust gas may branch from the recirculation flow path 160 to be supplied to the burner 400.

In specific, the air supply flow path 640 may be connected to a branch point between the exhaust flow path 610 and the recirculation flow path 160, and an air supply valve 745 may be installed at a connection portion between the air supply flow path 640 and the recirculation flow path 160.

With such a configuration, according to the seventh embodiment of the present invention, the supply of exhaust gas to the recirculation flow path 160 and the air supply flow path 640 may be controlled with a single air supply valve 745

While the present invention has been illustrated and described with reference to the exemplary embodiments thereof, it will be apparent to those of ordinary skill in the art that various changes in form and detail may be made thereto without departing from the spirit and scope of the present invention.

It is therefore to be understood that exemplary embodiments described above are to be considered in all respects only as illustrative and not restrictive. It should be understood that the scope of the present invention be indicated by the appended claims, and that all changes and modifications derived from the equivalent concept be included within the scope of the present invention.

INDUSTRIAL APPLICABILITY

According to exemplary embodiments of the present invention, not only the exhaust gas can be heated with a simple structure but also the exhaust gas can be easily heated even in a low speed or low load environment, and thus the present invention may be used to improve the purifying efficiency of the exhaust gas post-processing system.

The invention claimed is:

1. An exhaust gas post-processing system for aftertreating an exhaust gas discharged from an engine, the exhaust gas post-processing system comprising:
   an exhaust flow path for moving the exhaust gas discharged from the engine;
   at least one aftertreatment device installed on the exhaust flow path and purifying the exhaust gas;
   a burner installed on the exhaust flow path and heating the exhaust gas upstream of the at least one aftertreatment device;
   a fuel supplier for supplying a fuel to the burner; an aft supply flow path for supplying an aft to the burner; and
   a recirculation flow path for supplying a part of the exhaust gas discharged from the engine to the engine, wherein
   the air supply flow path supplies the part of the exhaust gas discharged from the engine as the aft to the burner and branches from the recirculation flow path, where the recirculation flow path branches from the exhaust flow path upstream of the burner,
   an oxygen concentration of the air supplied to the burner is in a range from 8% to 16%, and
   the burner is a high ignition energy burner.

2. The exhaust gas post-processing system of claim 1, wherein the high ignition energy burner is a plasma burner using plasma reaction.

3. The exhaust gas post-processing system of claim 1, further comprising an air supply valve installed on the air supply flow path including a branch point between the aft supply flow path and the exhaust flow path,
   wherein the exhaust gas discharged from the engine flows to the at least one aftertreatment device via a turbo charger, and
   the air supply flow path branches from the recirculation flow path in back of the turbo charger.

4. The exhaust gas post-processing system of claim 1, further comprising an air supply valve installed on the air supply flow path including a branch point between the air supply flow path and the exhaust flow path, and
   wherein the exhaust gas discharged from the engine flows to the at least one aftertreatment device via a turbo charger.

5. The exhaust gas post-processing system of claim 1, wherein the fuel supplier is configured to supply the fuel to the engine and the burner.

6. The exhaust gas post-processing system of claim 1, wherein the at least one aftertreatment device comprises a diesel particulate filter, and
   the burner is configured to receive the fuel and the air from the fuel supplier and the air supply flow path during regeneration of the diesel particulate filter, and heat the exhaust gas.

7. The exhaust gas post-processing system of claim 6, wherein the at least one aftertreatment device comprises a selective catalytic reduction reactor installed at the exhaust flow path downstream of the diesel particulate filter, and a reducing agent supplier installed at the exhaust flow path between the selective catalytic reduction reactor and the diesel particulate filter,
   further comprises an auxiliary burner installed between the reducing agent supplier and the diesel particulate filter, and
   wherein the auxiliary burner is configured to heat the exhaust gas that flows to the selective catalytic reduction reactor, separately from the diesel particulate filter.

8. The exhaust gas post-processing system of claim 1, wherein the at least one aftertreatment device comprises a selective catalytic reduction reactor, and a reducing agent supplier configured to inject a reducing agent at the exhaust flow path upstream of the selective catalytic reduction reactor, and
   the burner receives the fuel and the air from the fuel supplier and the air supply flow path, and heats the exhaust gas, when heating of the selective catalytic reduction reactor is needed.

9. The exhaust gas post-processing system of claim 8, wherein the at least one aftertreatment device further comprises a diesel particulate filter, and
   the diesel particulate filter is incorporated in the selective catalytic reduction reactor.

10. The exhaust gas post-processing system of claim 1, wherein the at least one aftertreatment device comprises at least one of a diesel oxidation catalyst device, a diesel particulate filter, or a selective catalytic reduction reactor.

* * * * *